United States Patent Office 3,128,268
Patented Apr. 7, 1964

3,128,268
RECOVERY OF COMPLEX LIPID MATERIAL AND PREPARATION OF CORRESPONDING FATTY ACID ALKYL ESTERS
Charles K. Cross, Rexdale, Ontario, Stepas Kairys, Toronto, Ontario, and Michael C. Attwell, Downsview, Ontario, Canada, assignors to Canada Packers Limited, Toronto, Ontario, Canada
No Drawing. Filed Oct. 18, 1961, Ser. No. 145,967
20 Claims. (Cl. 260—210)

This invention relates to an improved method for the recovery of complex lipid material from nerve tissue such as brain and spinal cords of bovine and other animals, and to the conversion of this matter into the corresponding fatty acid alkyl esters. The demand for fatty acid methyl esters of complex lipid materials, particularly for use in medical research programs, has increased to such an extent that it has become necessary to find a suitable, commercially feasible process to provide the lipid material of acceptable grade in relatively large quantities. It is the primary object of the present invention to provide such a process.

Lipid material of a complex nature contained in nerve tissue and which is recovered by the process of the present invention consists mainly of three constituents: (1) cerebrosides, (2) sphingomyelins, and (3) gangliosides. As a matter of convenience, it has previously been proposed that the term "sphingolipids" be used to designate these substances, because they are all derivatives of sphingosine

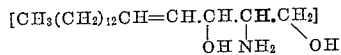

(Carter et al., J. Bio. Chem. 169, 77, 1947). The term "sphingolipids" will be so used hereinafter in the present application and claims.

Brain and spinal cord are the best sources of the sphingolipids. Carter et al. (loc. cit.) claim that fresh beef spinal cords contain 4.2% of cerebrosides and 1.37% of sphingomyelins. In addition, such nerve tissue contains about 67% water as well as small amounts of cholesterol, protein, lecithin, cephalin, mineral salts and smaller amounts of other less well-characterized substances.

Cerebrosides, which make up the major portion of the sphingolipids, contain one molecule each of sphingosine, galactose or occasionally glucose, and fatty acid. The fatty acid component appears to be chiefly of the 24-carbon variety, and the four characterized members of the group differ from one another in their constituent fatty acids. The saturated $C_{24}$ acid, lignoceric, occurs in the cerebroside kerasin, while its 2-hydroxy derivative, cerebronic acid, is found in phrenosin. The singly unsaturated 24-carbon acid, nervonic, and its 2-hydroxy analogue, oxynervonic, occur in nervone and oxynervone, respectively. The bond between the sphingosine and fatty acid portions is an amide linkage, while the hexose is attached by an acetal or glycosidic bond.

The sphingomyelins contain equimolar amounts of fatty acid, choline, phosphoric acid, and sphingosine. As in the cerebrosides, the fatty acid residue is in amide linkage to the sphingosine amino group.

Gangliosides represent the less clearly defined lipids present in nerve tissue. They resemble the cerebrosides and on hydrolysis yield sphingosine, stearic acid, neuraminic acid, and galactose.

Sphingolipids prepared from bovine spinal cords according to the procedure of Carter et al. (loc. cit.) yield fatty acid methyl esters of an acceptable grade for medical research work. This process involves repeated acetone extractions of the fresh tissue to remove water, neutral fats, and cholesterol, followed by repeated ether extraction to remove lecithin and cephalin. The sphingolipids are then extracted from the residues by repeated extraction with boiling ethanol and precipitation by cooling. However, the process of Carter et al. is painfully slow and hazardous, and has not been found applicable to commercial-scale production. The main objections to this method are the use of low boiling diethyl ether as a solvent and the necessity of performing repeated boiling ethanol extractions on the residues to recover the sphingolipids. Filtration problems are encountered with the ether extracts, and the method is very time-consuming as well as wasteful of solvents. Other processes have been proposed but have proved to be very unsatisfactory because of various impurities present in the end product.

It is, therefore, another object of the invention to provide an improved solvent extraction procedure for the recovery of sphingolipids from nerve tissue.

Another object of the invention is to provide improved methods for the purification of a sphingolipid fraction obtained from nerve tissue.

Another object of the invention is to provide commercially feasible methods for the recovery of sphingolipids in relatively pure form for conversion to the corresponding alkyl esters of the fatty acid portion.

Another object of the invention is to provide a process for the production of fatty acid methyl esters of the fatty acids of sphingolipids in good yield and in relatively pure form from nerve tissues.

Another object of the invention is to provide a method for the simultaneous dehydration and extraction of sphingolipids from nerve tissue.

Another object of the invention is to provide extraction procedures for sphingolipids which conserve solvents, avoid filtration difficulties and provide good yields of a product of acceptable purity.

The overall process of the present invention comprises drying the nerve tissue by vacuum, or by azeotropic distillation with ethylene dichloride, extracting a sphingolipid-containing fraction from the dried tissue with a special solvent or solvent mixture, and isolating the sphingolipids in a single step from the evaporated extract by the use of a mono- or dialkyl ether of ethylene glycol or diethylene glycol as a crystallizing solvent. Lower alkyl esters are then prepared from the crystallized sphingolipids by hydrolyzing the amide linkage and converting the acids so formed to the desired ester. This is accomplished by the use of a strong acid and selected lower alcohol.

Preferably, the nerve tissue is vacuum-dried prior to the extraction. This can be accomplished in a conventional vacuum shelf dryer using temperatures of, for example, in the range of 100 to 170° F. Where azeotropic distillation with ethylene dichloride is used for the dehydration step, ethylene dichloride is also preferably utilized for the extraction, and dehydration and extraction of the sphingolipid material with this solvent may be simultaneously obtained. The sphingolipids are soluble in warm ethylene dichloride. Either drying procedure is a substantial improvement over the repeated acetone extractions that have been utilized by prior art processes.

One of the most efficient extracting solvents for recovery of the sphingolipid material from the dried nerve tissue is benzene containing ethanol. The use of about 25% ethanol with respect to the benzene solves filtration difficulties. Lower proportions of ethanol can be used with improved filtration over benzene alone, and higher proportions of ethanol could be used but are not necessary. While the proportions of ethanol to benzene are not sharply critical, it can be stated that, in general, from about 10% to 40% may be used. The ethanol may form part of the extraction solvent at the beginning of the extraction procedure, or it may be added during the extraction procedure and after distillation of part of the benzene to remove residual traces of moisture. While the presence of ethanol makes filtration a great deal easier, the invention contemplates the use of other solvents for extraction of the sphingolipid-containing fraction from the dried nerve tissue including, but not limited to, hot benzene alone, chloroform-methanol, ethanol, and ethylene dichloride. Small amounts of ethanol may be used for improving filtration procedure where other solvents such as ethylene dichloride are used.

After the sphingolipid-containing fraction is extracted from the dried nerve tissue, the desired sphingolipid material is isolated by crystallization from a solvent selected from the alkyl ethers of ethylene glycol or of diethylene glycol. (Cephalin and lecithin as well as other undesired materials remain in the solution during crystallization of the sphingolipids and may be recovered by other procedures.) By this procedure the sphingolipid fraction can be isolated in a single step, thereby avoiding the repeated extractions previously required with other solvents. Thus, after evaporation of the benzene-ethanol or other extracting solvent, the residue is dissolved in the selected alkyl ether of ethylene or diethylene glycol and the sphingolipids are crystallized therefrom by cooling. It has been found that the dialkyl ethers (e.g., dimethyl and diethyl) generally give a better product, having a lower iodine value and saponification equivalent, than the monoalkyl ethers. The monoalkyl ethers provide a product of higher yield, but of less purity. If desired, the monoalkyl ethers can be utilized for a first crystallization procedure followed by recrystallization from a dialkyl ether of ethylene or diethylene glycol. In accomplishing the crystallization, the crystallizing solvent is heated until the lipid material dissolves, whereupon after cooling, the desired fraction of sphingolipids crystallizes as a white precipitate.

The solvents from which the sphingolipid fraction will satisfactorily crystallize in a single step are quite unexpectedly limited to the alkyl ethers of ethylene glycol and diethylene glycol. Such closely related solvents as triethylene glycol mono- and dialkyl ethers, and the monoacetates of the monoalkyl ethers of ethylene glycol and diethylene glycol are uniformly unsuccessful, either failing to provide a solid product or producing such an impure product as to be of little value. Further, it is preferred that the alkyl substituents of the selected solvents be either methyl or ethyl. Alkyl ethers of ethylene or diethylene glycol wherein the alkyl substituents are of longer chain length than ethyl, provide less satisfactory results.

Following the crystallization of the sphingolipids, the cholesterol content may be reduced by extraction with acetone. The material is then dried, preferably in vacuo, and the products are kept under refrigeration.

Once the sphingolipid fraction is obtained, the desired alkyl esters of the corresponding fatty acids are produced by a reaction utilizing a mixture of the selected lower alcohol and strong acid. Sulphuric acid or other strong mineral acids are generally satisfactory. The resulting material is of acceptable grade for use in accordance with the present demands.

The invention will be further illustrated by the following examples of practice:

EXAMPLE I (a) *Vacuum drying of bovine spinal cords.*—The fresh cords were ground through the meat grinder, spread evenly on trays to a thickness of about 1 inch, and dried in a vacuum oven at 150–160° F. for 48 hours. The dried spinal cords were scraped off the trays, weighed, and stored in the freezer for future use. The average yield of dried spinal cords obtained was 30.0% of the weight of fresh cords processed.

(b) *Extraction with benzene.*—150 g. of the vacuum-dried spinal cords were stirred in a 3-liter flask with 1000 ml. benzene and refluxed on a steam bath for 15 minutes. The hot mixture was filtered through two thicknesses of cheesecloth stretched across the top of a beaker and benzene was removed by pressing the residue. The extraction of residue was repeated twice, using 500 ml. and 300 ml. boiling benzene, respectively. The combined turbid extract was warmed to about 70° C. and filtered through heavy cloth precoated with diatomaceous filter aid. The clear filtrate was distilled on a steam bath initially at atmospheric pressure and finally under water pump vacuum to yield a brown, viscous residue. 300 ml. of one of the crystallizing solvents were added to the residue and the mixture was heated on a steam bath until the material dissolved. The solution was left to crystallize at room temperature overnight (16 hours). The crystalline precipitate was filtered on a Buchner funnel and the filter cake was washed without pressing with 20 ml. of crystallizing solvent. The still wet precipitate was extracted three times with 100 ml. acetone, each time at room temperature to remove cholesterol and then dried in vacuo at 50° C. to the constant weight (approximately 1 hour). The white crystalline products were kept refrigerated in well-closed containers.

(c) *Preparation of sphingolipid fatty acid methyl esters.*—20 g. of the sphingolipids were added to 200 ml. methanol containing 10 ml. of concentrated sulphuric acid and refluxed on a steam bath for 6 hours. The cooled reaction mixture (to room temperature), containing some white precipitate, was extracted with three 140-ml. portions of hexane. The combined hexane extract was washed twice with 60 ml. portions of 50% aqueous methanol and once with water (60 ml.) The hexane layer was decolorized with carbon and evaporated in vacuo to dryness to yield a white waxy solid.

The results of this procedure with different alkyl ethers of ethylene glycol and diethylene glycol as the crystallizing solvent and a comparison with prior art procedure are given in the following table:

*Table 1*

PREPARATION OF SPHINGOLIPIDS AND THEIR FATTY ACID METHYL ESTERS USING BENZENE AS EXTRACTING SOLVENT FOR SPHINGOLIPIDS

| Sphingolipids Crystallizing Solvent | Wt. Percent Yield of Sphingolipids | | Analysis of Sphingolipids | | | Wt. Percent Yield of Sphingolipid Fatty Acid Methyl Esters | | | Analysis of Methyl Esters | | |
|---|---|---|---|---|---|---|---|---|---|---|---|
| | From Dried Spinal Cords | From Fresh Spinal Cords | N, Percent (Kjeldahl) | P, Percent | Cholesterol, mg./gm. | From Sphingolipids | From Dried Spinal Cords | From Fresh Spinal Cords | I.V. (Wijs) | S.E. | Cholesterol, mg./gm. |
| Ethylene Glycol Monoethyl Ether | 24.8 | 7.5 | 2.23 | 1.82 | 12.2 | 47.2 | 11.7 | 3.5 | 43.3 | 379 | 3.8 |
| Ethylene Glycol Dimethyl Ether | 20.0 | 6.0 | 2.35 | 1.32 | 6.6 | 43.2 | 8.6 | 2.6 | 25.7 | 374 | 2.7 |
| Diethylene Glycol Monoethyl Ether | 30.2 | 9.0 | 2.07 | 1.65 | 18.9 | 42.2 | 12.8 | 3.8 | 47.7 | 386 | 6.3 |
| Diethylene Glycol Diethyl Ether | 19.9 | 6.0 | 2.29 | 1.23 | 6.0 | 41.5 | 8.3 | 2.5 | 25.2 | 369 | 0.3 |
| Procedure of Carter et al | | 4.9 | | | | 47.1 | | 2.3 | 25.0 | 367 | |

EXAMPLE II

*Extraction with chloroform-methanol (1:1).*—150 g. of vacuum-dried spinal cords (as in Example I) were stirred in a 2-liter flask with 300 ml. chloroform-methanol mixture (1:1) for one hour. The mixture was filtered through two thicknesses of cheesecloth stretched across the top of a beaker and the solvent was removed by pressing the residue manually. The extraction of residue was repeated with chloroform-methanol (1:1) twice using 300 ml. each time. The combined turbid extract was evaporated on a steam bath initially at atmospheric pressure and finally under water pump vacuum to yield a brown, viscous residue.

The crystallization of sphingolipids and removal of cholesterol were carried out exactly as described in Example I, except that the residue solution in the crystallizing solvent was filtered prior to the crystallization while still warm (approx. 60° C.). Methyl esters were prepared as in Example I. The results are given in the following table:

*Table 2*

PREPARATION OF SPHINGOLIPIDS AND THEIR FATTY ACID METHYL ESTERS USING CHLOROFORM-METHANOL (1:1) AS EXTRACTING SOLVENT FOR SPHINGOLIPIDS

| Sphingolipids Crystallizing Solvent | Wt. Percent Yield of Sphingolipids | | Analysis of Sphingolipids | | | Wt. Percent Yield of Sphingolipid Fatty Acid Methyl Esters | | | Analysis of Methyl Esters | | |
|---|---|---|---|---|---|---|---|---|---|---|---|
| | From Dried Spinal Cords | From Fresh Spinal Cords | N, Percent (Kjeldahl) | P, Percent | Cholesterol, mg./gm. | From Sphingolipids | From Dried Spinal Cords | From Fresh Spinal Cords | I.V. (Wijs) | S.E. | Cholesterol, mg./gm. |
| Ethylene Glycol Monoethyl Ether | 18.3 | 5.5 | 2.55 | 1.71 | 6.1 | 46.5 | 8.7 | 2.7 | 41.8 | 375 | 2.7 |
| Ethylene Glycol Dimethyl Ether | 18.8 | 5.7 | 2.46 | 1.26 | 6.3 | 41.7 | 7.9 | 2.4 | 23.8 | 368 | 2.6 |
| Diethylene Glycol Monoethyl Ether | 30.5 | 9.0 | 2.19 | 1.57 | 17.2 | 44.2 | 13.5 | 4.0 | 51.4 | 389 | 7.8 |
| Diethylene Glycol Diethyl Ether | 22.7 | 6.8 | 2.39 | 1.31 | 8.2 | 39.2 | 8.9 | 2.7 | 26.9 | 367 | 3.6 |
| Procedure of Carter et al | | 4.9 | | | | 47.1 | | 2.3 | 25.0 | 367 | |

EXAMPLE III

*Drying fresh spinal cords by azeotropic distillation with ethylene dichloride and simultaneous sphingolipid extraction.*—1 kg. of fresh spinal cords was stirred with 2 liters of ethylene dichloride in a 5-liter, 3-necked flask and the solvent distilled at atmospheric pressure. After the collection of about 1 liter of distillate, 1 liter of fresh ethylene dichloride was added and the distillation continued. Water was separated from the distillate and the solvent layer was returned to the flask.

This procedure of removing the water from fresh spinal cords was continued until practically no more water was coming over azeotropically and the vapor temperature reached 83° C. (in approx. 9 hours). The volume of the mixture at this stage was approximately 1 liter. Since the filtration of this mixture by gravity was practically impossible, 250 ml. of ethanol were added to the mixture. After refluxing for 10 minutes, the hot mixture was filtered under partial vacuum through heavy cloth precoated with a diatomaceous filter aid. The filtration on this scale was easy. The filter cake was washed with 200 ml. ethylene dichloride containing 50 ml. ethanol.

The clear filtrate was evaporated to about one-half of its volume, weighed, and divided into 2 equal parts, each corresponding to 500 g. of fresh spinal cords. Each part was evaporated to dryness, the residue (122 g. in each flask) was crystallized from crystallizing solvents, and worked up as described in Example I.

The results are given in the following table:

*Table 3*

PREPARATION OF SPHINGOLIPIDS AND THEIR FATTY ACID METHYL ESTERS BY DRYING FRESH SPINAL CORDS BY AZEOTROPIC DISTILLATION WITH ETHYLENE DICHLORIDE AND SIMULTANEOUSLY EXTRACTING THE SPHINGOLIPIDS

| Sphingolipids Crystallizing Solvent | Wt. Percent Yield of Sphingolipids From Fresh Spinal Cords | Analysis of Sphingolipids | | | Wt. Percent Yield of Sphingolipid Fatty Acid Methyl Esters | | Analysis of Methyl Esters | | |
|---|---|---|---|---|---|---|---|---|---|
| | | N, Percent (Kjeldahl) | P, Percent | Cholesterol, mg./gm. | From Sphingolipids | From Fresh Spinal Cords | I.V. (Wijs) | S.E. | Cholesterol, mg./gm. |
| Ethylene Glyco Dimethyl Ether | 5.6 | 2.36 | 1.30 | 6.5 | 39.8 | 2.23 | 25.3 | 374 | 1.4 |
| Diethylene Glycol Diethyl Ether | 7.1 | 2.33 | 1.27 | 4.2 | 41.3 | 2.94 | 27.8 | 362 | 1.1 |
| Procedure of Carter et al | 4.9 | | | | 47.1 | 2.3 | 25.0 | 367 | |

EXAMPLE IV

*Extraction with benzene containing 25% ethanol.*—300 g. of vacuum-dried spinal cords were stirred and heated with 2000 ml. benzene. 1000 ml. of solvent were distilled off to insure a complete dryness of the mixture. The mixture was then stirred vigorously and refluxed for 1 hour. 250 ml. ethanol were added to the mixture and the reflux was continued for an additional 10 minutes. Some filter aid was added to the warm mixture and it was filtered through heavy cloth precoated with the same filter aid. The filter cake was washed with a hot mixture containing 500 ml. benzene and 125 ml. ethanol. The clear filtrate was evaporated to approximately 1 liter, weighed, and divided into 2 equal parts, each corresponding to 150 g. of dried spinal cords.

Each part was evaporated to dryness, the residue (117.5 g. in each flask) was crystallized by dissolving in 300 ml. of hot crystallizing solvent, and worked up as described in Example I. The results are given in the following table: (In this table the designation "Standard initial extr. procedure" refers to extraction using hot benzene alone, see Table 1, and is included for comparative purposes.)

*Table 4*

PREPARATION OF SPHINGOLIPIDS AND THEIR FATTY ACID METHYL ESTERS USING BENZENE-ETHANOL AS INITIAL EXTRACTING SOLVENT FOR SPHINGOLIPIDS

| Sphingolipids Crystallizing Solvent | Wt. Percent Yield of Sphingolipids | | Analysis of Sphingolipids | | | Wt. Percent Yield of Sphingolipid Fatty Acid Methyl Esters | | | Analysis of Methyl Esters | | |
|---|---|---|---|---|---|---|---|---|---|---|---|
| | From Dried Spinal Cords | From Fresh Spinal Cords | N, Percent (Kjeldahl) | P, Percent | Cholesterol, mg./gm. | From Sphingolipids | From Dried Spinal Cords | From Fresh Spinal Cords | I.V. (Wijs) | S.E. | Cholesterol, mg./gm. |
| Ethylene Glycol Dimethyl Ether | 19.2 | 5.8 | 2.43 | 1.29 | 9.9 | 40.2 | 7.7 | 2.5 | 24.2 | 374 | 2.8 |
| Ethylene Glycol Dimethyl Ether (Standard initial extr. procedure) | 20.0 | 6.0 | 2.35 | 1.32 | 6.6 | 43.2 | 8.7 | 2.6 | 25.7 | 374 | 2.7 |
| Diethylene Glycol Diethyl Ether | 23.8 | 7.2 | 2.43 | 1.25 | 5.7 | 39.9 | 9.5 | 2.9 | 26.9 | 372 | 1.4 |
| Diethylene Glycol Diethyl Ether (Standard initial extr. procedure) | 19.9 | 6.0 | 2.29 | 1.23 | 6.0 | 41.5 | 8.3 | 2.5 | 25.2 | 369 | 0.3 |
| Procedure of Carter et al. | | 4.9 | | | | 47.1 | | 2.3 | 25.0 | 367 | |

Referring now to Table 1, reporting the results wherein benzene was utilized as the initial extracting solvent for the sphingolipid fraction, it will be seen that ethylene glycol dimethyl ether and diethylene glycol diethyl ether as sphingolipid crystallizing solvents yielded fatty acid methyl esters most closely resembling the material prepared according to the procedure of Carter et al. (utilized as a standard of comparison). Thus, iodine values (I.V.) of 25.7 and 25.2 and saponification equivalents (S.E.) of 374 and 369 were obtained, respectively, as compared with an iodine value of 25.0 and saponification equivalent of 367 for the Carter et al. material. Gas chromatogram recordings also indicated that the esters were similar. The yields of sphingolipids and their fatty acid methyl esters compared favorably with the yields obtained in Carter et al.'s procedure. However, the procedure was greatly simplified with respect to that of Carter et al.

Ethylene glycol monoethyl ether and diethylene glycol monoethyl ether as crystallizing solvents provided higher yields; however, the esters were of lower quality. While the products from these crystallizations compare favorably with those commercially available from other known procedures, further purification in some instances is desirable. This can be accomplished by, as aforesaid, a recrystallization step from a dialkyl ether of either ethylene glycol or diethylene glycol.

As can be seen from Table 2, reporting the results utilizing chloroform-methanol as the initial extracting solvent for the sphingolipid fraction, ethylene glycol dimethyl ether and diethylene glycol diethyl ether as crystallizing solvents again yielded products of high quality most closely resembling the material of Carter et al. Gas chromatogram recordings were similar. Again, ethylene glycol monoethyl ether and diethylene glycol monoethyl ether as crystallizing solvents for the sphingolipids gave esters of lower quality.

Chloroform-methanol (1:1) extraction and benzene extraction (see Tables 1 and 2) for the initial extracting procedure show similar extracting properties, the variation in yields reported being due mainly to the crystallizing conditions.

Referring now to Table 3, reporting the results wherein ethylene dichloride was utilized for drying the fresh spinal cords by azeotropic distillation and simultaneous extraction of the sphingolipid fraction, it will be seen that the products derived from the use of both ethylene glycol dimethyl ether and diethylene glycol diethyl ether were of good quality and compared favorably with the standard. Diethylene glycol diethyl ether provided sphingolipids and corresponding fatty acid esters in a higher yield; however, the I.V. was slightly higher for the product from this crystallization solvent. Gas chromatogram recordings indicated that both end products were similar.

From Table 4, reporting the results wherein benzene-ethanol was utilized as the initial extracting solvent for the sphingolipid fraction, it will be seen that ethylene glycol dimethyl ether and diethylene glycol diethyl ether as crystallizing solvents both yielded fatty acid methyl esters of high quality, closely resembling the product prepared according to the procedure of Carter et al. The gas chromatogram recordings indicated that the esters were similar. The yields obtained by this extraction procedure compared favorably with the yields obtained both by the procedure of Carter et al. and by the procedure in which benzene alone was used as the initial extraction solvent.

However, the use of a minor proportion of ethanol along with the benzene in the initial extraction procedure is important because extraction and filtration are much more readily accomplished. Thus, in the extraction of dried spinal cords with hot benzene (Example I), 150 grams of the dried spinal cords were extracted with 1800 ml. of boiling benzene in 3 consecutive portions: 1000 ml., 500 ml. and 300 ml., respectively. Each extract was filtered through cheesecloth or centrifuged (on a pilot-plant scale). This procedure was time-consuming. The procedure with benzene-ethanol, as shown in Example IV, requires 2000 ml. boiling benzene for 300 grams dried spinal cords in only one step. 1000 ml. solvent is removed by distillation to remove traces of water from the dried spinal cords, and the subsequent addition and reflux with 250 ml. of ethanol converts the extract into an easily filterable form. This procedure is quite readily adapted to commercial scale and, accordingly, constitutes one of the preferred procedures of this invention. Use of a small amount of ethanol along with ethylene dichloride also improves this extraction procedure.

EXAMPLE V

*Preparation of sphingolipids and their corresponding fatty acid methyl esters.*—Fresh beef spinal cords (189 lbs.) were finely ground through a meat grinder, spread thinly on trays and dried in a vacuum oven at 65° C. for 48 hours.

The dried spinal cords (55 lbs.) and benzene (40 gal.) were added to a still. 20 gal. of benzene were distilled off, following which the mixture was refluxed for 1 hour. The contents were stirred throughout. After slight cooling, ethanol (5 gal.) was added and the mixture refluxed for an additional hour. The mixture was cooled to about 60° C. and then filtered through a coarse cloth precoated with a diatomaceous filter aid. The filter cake was washed with a hot mixture of benzene (10 gal.) and ethanol (2.5 gal.). The clear filtrate was evaporated to dryness, initially at atmospheric pressure and finally under vacuum, to yield a brown gummy residue, which was dissolved in diethylene glycol diethyl ether (11 gal.) by heating and stirring at 80–90° C. for 30 minutes. This solution was allowed to crystallize at room temperature overnight (16 hours). The crystalline precipitate was filtered and the filter cake washed with diethylene glycol diethyl ether (1 gal.). This filter cake was redissolved in fresh diethylene glycol diethyl ether (11 gal.), and recrystallized as before. To reduce the cholesterol content, the wet filter cake was leached twice with acetone (11 gal.) by stirring and heating at 40° C., cooling to 20° C. and then filtering. After the second acetone leach the filter cake was dried in a vacuum oven at 40° C. The sphingolipids, a white powder, weighed 11.6 lbs.

The sphingolipids (11.6 lbs.) were refluxed with methanol (11.6 gal.) containing concentrated sulphuric acid (0.58 gal.) for 6 hours. The reaction mixture was cooled to room temperature and extracted three times with hexane (8.2 gal. each extract). The combined hexane extract was then washed twice with 50% aqueous methanol (3.5 gal.) and once with water (3.5 gal.). The hexane solution was then decolorized with carbon (1 lb.), filtered and evaporated in vacuo to complete dryness to yield a white waxy solid. These fatty acid methyl esters derived from the sphingolipids weighed 4.58 lbs. and had an iodine value of 25.0 and a saponification equivalent of 367.

The corresponding fatty acid ethyl esters of the sphingolipids can be similarly produced by the substitution of ethyl alcohol for the methyl alcohol in the above procedure.

In summary, the procedure of the present invention provides the following improvements:

(1) In the drying of fresh nerve tissue. By utilizing either vacuum drying methods or azeotropic distillation with ethylene dichloride, repeated extractions with acetone which are time-consuming and involve difficult filtrations are eliminated.

(2) In the extraction of the sphingolipid fraction after drying. By the use, preferably, of benzene-ethanol, or ethylene dichloride-ethanol if azeotropic drying is used, a single extraction can be made and the filtrations with either of these procedures is quite easy, whereas ether extraction to remove glycerophosphatides in the procedures of the prior art is time-consuming, requires repeated extractions, difficult filtrations, and results in waste of solvents.

(3) In the isolation of the sphingolipids after initial extraction. By crystallization from ethylene or diethylene glycol mono- or dialkyl ethers at room temperature, the filtration of the crystallized sphingolipids is reasonably easy and a product of good quality is obtained. Final washings with acetone to remove cholesterol and the residual high boiling crystallizing solvent is quite readily accomplished. On the other hand, recovery of sphingolipids from an ethanol extract requires crystallization at 0° C., and is comparatively difficult to handle. Moreover, ethanol extraction of nerve material which has been previously extracted with acetone and ether, as in previous processes, requires repeated extractions with boiling ethanol.

It will be seen that the present invention provides greatly simplified and much more economic procedure without substantial sacrifice of product purity.

What we claim as our invention is:

1. In a method for the preparation of alkyl esters of fatty acids of sphingolipids derived from nerve tissue, comprising the steps of dehydrating said nerve tissue, extracting the sphingolipid fraction from the dehydrated material, recovering the extracted sphingolipids from a solvent and reacting the recovered sphingolipid material with a lower alcohol in the presence of a strong acid to provide the corresponding lower alkyl esters of the sphingolipid fatty acids, the improvement comprising recovering the extracted sphingolipids by crystallizing them from a solvent selected from the group consisting of the mono- and dialkyl ethers of ethylene and diethylene glycol.

2. In a method for the recovery of sphingolipids from nerve tissue comprising the steps of dehydrating said nerve tissue, extracting the sphingolipid fraction with a solvent therefor, and recovering the extracted sphingolipid fraction, the improvement, comprising: crystallizing said sphingolipid fraction from a solvent selected from the group consisted of the mono- and dialkyl ethers of ethylene and diethylene glycol.

3. In a method for the preparation of methyl esters of fatty acids of sphingolipids derived from nerve tissue comprising the steps of dehydrating said nerve tissue, extracting the sphingolipid fraction from the dehydrated material with an organic solvent, recovering the extracted sphingolipid fraction and reacting the recovered material with methyl alcohol in the presence of sulphuric acid to provide the corresponding methyl esters of the sphingolipid fatty acids, the improvement, comprising: crystallizing the extracted sphingolipids from a solvent selected from the group consisting of the mono- and dimethyl and ethyl ethers of ethylene glycol and diethylene glycol.

4. A method for the recovery of sphingolipids from nerve tissue, comprising: dehydrating said nerve tissue under vacuum, extracting the sphingolipid fraction with a solvent therefor, recovering the sphingolipid fraction from said solvent and crystallizing said fraction from a solvent selected from the group consisting of the mono- and dialkyl ethers of ethylene and diethylene glycol.

5. A method for the simultaneous dehydration and extraction of sphingolipids from nerve tissue, comprising: mixing said nerve tissue with ethylene dichloride, azeotropically distilling said mixture until the moisture is substantially removed and then separating the hot ethylene dichloride containing the sphingolipid fraction from the residual material.

6. The method of claim 5 wherein a portion of ethanol is added to said ethylene dichloride.

7. A method for the recovery of sphingolipids from nerve tissue, comprising: extracting dehydrated nerve tissue with hot benzene-ethanol solution containing from about 10% to about 40% ethanol and separating the hot liquid containing the sphingolipid fraction from the residual tissue.

8. A method for the extraction of sphingolipids from nerve tissue, comprising: mixing said nerve tissue with benzene, distilling a portion of said benzene from said mixture to remove traces of water, adding a portion of ethanol to the mixture, the proportion of ethanol being about 10% to about 40% of the total amount of extracting solvent, refluxing the resulting mixture, and separating the hot liquid containing the sphingolipid fraction from the residual tissue.

9. A method for the purification of a sphingolipid fraction which has been solvent-extracted from nerve tissue comprising: dissolving said extracted sphingolipid fraction in a solvent selected from the group consisting of the mono- and di- methyl and ethyl ethers of ethylene glycol and diethylene glycol, and crystallizing the sphingolipid from said solvent.

10. The method as defined in claim 9 wherein said solvent is ethylene glycol monoethyl ether.

11. The method as defined in claim 9 wherein said solvent is ethylene glycol dimethyl ether.

12. The method as defined in claim 9 wherein said solvent is diethylene glycol monoethyl ether.

13. The method as defined in claim 9 wherein said solvent is diethylene glycol diethyl ether.

14. The method as defined in claim 9 wherein said crystalized material is washed with acetone to reduce the cholesterol content.

15. A method for the recovery of sphingolipids from nerve tissue, comprising: mixing said nerve tissue in ethylene dichloride, subjecting said mixture to azeotropic distillation until most of the moisture has been removed, separating the remaining hot ethylene dichloride solution containing the sphingolipid fraction from the residual material, removing the ethylene dichloride from the sphingolipid fraction and recrystallizing the sphingolipid fraction from a solvent selected from the group consisting of mono- and di- methyl and ethyl ethers of ethylene glycol and diethylene glycol.

16. A method for the recovery of sphingolipids from nerve tissue, comprising: vacuum-drying said nerve tissue to remove most of the moisture, extracting said vacuum-dried material with hot benzene-ethanol mixture containing from about 10% to about 40% ethanol, recovering the sphingolipid fraction from the extract, dissolving said sphingolipid fraction in a solvent selected from the group consisting of the mono- and di- methyl and ethyl ethers of ethylene glycol and diethylene glycol, and crystallizing a purified sphingolipid fraction from said solvent.

17. A method for the recovery of sphingolipids from nerve tissue, comprising: vacuum-drying of said nerve tissue to remove most of the moisture, mixing the dried nerve tissue with benzene, distilling a portion of said benzene from the mixture to remove traces of moisture, adding a portion of ethanol to the mixture, the proportion of ethanol being about 10% to about 40% of the total amount of extracting solvent, refluxing the resulting mixture, separating the solvent containing the sphingolipid fraction from the residual material, removing the solvent from said fraction, dissolving said fraction in a solvent selected from the group consisting of the mono- and di- methyl and ethyl ethers of ethylene glycol and diethylene glycol, and crystallizing a purified sphingolipid fraction from said solvent.

18. The method defined in claim 17 wherein the said solvent is ethylene glycol dimethyl ether.

19. The method defined in claim 17 wherein the said solvent is diethylene glycol diethyl ether.

20. A method for the recovery of sphingolipids from nerve tissue, comprising: dehydrating said nerve tissue by azeotropic distillation with ethylene dichloride with simultaneous extraction of the sphingolipid fraction in said ethylene dichloride, recovering the sphingolipid fraction from said ethylene dichloride and crystallizing said fraction with a solvent selected from the group consisting of the mono- and dialkyl ethers of ethylene and diethylene glycol.

References Cited in the file of this patent

Carter et al.: J. Biol. Chem. 169, pp. 77–82 (1947).